(12) United States Patent
Chou et al.

(10) Patent No.: US 7,510,529 B2
(45) Date of Patent: *Mar. 31, 2009

(54) ULTRASOUND RECONSTRUCTION UNIT

(75) Inventors: Ching-Hua Chou, Fremont, CA (US);
Glen W. McLaughlin, Saratoga, CA (US);
Larry Y. L. Mo, San Ramon, CA (US);
Ting-Lan Ji, San Jose, CA (US)

(73) Assignee: ZONARE Medical Systems, Inc., Mountain View, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 11/453,336

(22) Filed: Jun. 13, 2006

(65) Prior Publication Data

US 2007/0038102 A1 Feb. 15, 2007

Related U.S. Application Data

(63) Continuation of application No. 11/048,288, filed on Jan. 31, 2005, now Pat. No. 7,087,020, which is a continuation of application No. 10/246,854, filed on Sep. 18, 2002, now Pat. No. 6,866,632.

(51) Int. Cl.
*A61B 8/00* (2006.01)

(52) U.S. Cl. ........................ 600/443; 600/437

(58) Field of Classification Search .................. 600/443, 600/410, 437, 411, 414, 415
See application file for complete search history.

(56) References Cited

U.S. PATENT DOCUMENTS

| | | | |
|---|---|---|---|
| 5,278,757 A | | 1/1994 | Hoctor et al. |
| 5,339,282 A | | 8/1994 | Kuhn et al. |
| 5,465,722 A | * | 11/1995 | Fort et al. ................ 600/447 |
| 5,515,727 A | * | 5/1996 | Miwa et al. .............. 73/602 |
| 5,740,806 A | * | 4/1998 | Miller ..................... 600/459 |
| 5,860,926 A | | 1/1999 | Barabash et al. |
| 5,865,750 A | * | 2/1999 | Hatfield et al. ........... 600/443 |
| 5,897,501 A | * | 4/1999 | Wildes et al. ............ 600/447 |

(Continued)

OTHER PUBLICATIONS

Lu, Jian-Yu, "Experimental Study of High Frame Rate Imaging with Limited Diffraction Beams," IEEE Trans. on Ultrasonics (Jan. 1998) pp. 84-97, vol. 45, No. 1.

*Primary Examiner*—Long V Le
*Assistant Examiner*—Saurel J Selkin
(74) *Attorney, Agent, or Firm*—Carr & Ferrell LLP

(57) ABSTRACT

An ultrasound reconstruction unit is provided. In one embodiment, a receive aperture control engine for the unit adaptively determines a set of reconstruction signals based on at least a series of selected echo signals and compares the size of a receive aperture with a predetermined number of reconstruction channels at each imaging point. The unit passes the selected echo signals from selected receive channels of one or more transducer elements to a reconstruction processor if the size of the receive aperture is not greater than the number of reconstruction channels. In another embodiment, the control engine compares the size of the receive aperture with a predetermined number of reconstruction channels at each imaging point and preprocess the selected echo signals to produce reconstructions signals that are equal in number to the number of reconstruction channels if the size of the receive aperture is greater than the number of reconstruction channels. The engine then outputs the reconstruction signals for further processing by a reconstruction processor.

19 Claims, 5 Drawing Sheets

U.S. PATENT DOCUMENTS

| | | |
|---|---|---|
| 5,902,241 A | 5/1999 | Seyed-Bolorforosh et al. |
| 6,055,861 A | 5/2000 | Banta, Jr. et al. |
| 6,089,096 A | 7/2000 | Alexandru |
| 6,174,286 B1 | 1/2001 | Ramamurthy et al. |
| 6,251,073 B1 | 6/2001 | Imran et al. |
| 6,309,356 B1 | 10/2001 | Ustuner et al. |
| 6,569,102 B2 * | 5/2003 | Imran et al. ............ 600/459 |
| 6,572,547 B2 * | 6/2003 | Miller et al. ............ 600/437 |
| 6,866,632 B1 | 3/2005 | Chou et al. |
| 7,087,020 B2 | 8/2006 | Chou et al. |
| 2007/0038102 A1 * | 2/2007 | Chou et al. ............ 600/443 |

* cited by examiner

ULTRASOUND RECONSTRUCTION UNIT

CROSS REFERENCE TO RELATED APPLICATIONS

This application is a continuation and claims the priority benefit of U.S. patent application Ser. No. 11/048,288 filed Jan. 31, 2005 and entitled "Ultrasound Image Reconstruction with Receive Aperture Control" and now U.S. Pat. No. 7,087,020, which is a continuation and claims the priority benefit of U.S. patent application Ser. No. 10/246,854 filed Sep. 18, 2002, now U.S. Pat. No. 6,866,632, and entitled "Adaptive Receive Aperture for Ultrasound Image Reconstruction." The disclosure of these commonly owned applications is incorporated herein by reference.

BACKGROUND OF THE INVENTION

1. Field of the Invention

This invention relates generally to ultrasound imaging systems and relates more particularly to ultrasound image reconstruction.

2. Description of the Background Art

Ultrasonic imaging is a frequently used method of analysis for examining a wide range of materials. Ultrasonic imaging is especially common in medicine because of its relatively non-invasive nature, low cost, and fast response times. Typically, ultrasonic imaging is accomplished by generating and directing ultrasonic signals into a medium under investigation using a set of ultrasound generating transducers and then observing reflections or scatterings generated at the boundaries of dissimilar materials, such as tissues within a patient, using a set of ultrasound receiving transducers. The receiving and generating transducers may be arranged in arrays and are typically different sets of transducers, but may differ only in the circuitry to which they are connected. The reflections are converted to electrical signals by the receiving transducers and then processed, using techniques known in the art, to determine the locations of echo sources. The resulting data is displayed using a display device, such as a monitor.

Typically, the ultrasonic signal transmitted into the medium under investigation is generated by applying continuous or pulsed electronic signals to an ultrasound generating transducer. The transmitted ultrasound is most commonly in the range of 1 MHz to 15 MHz. The ultrasound propagates through the medium under investigation and reflects off interfaces, such as boundaries, between adjacent tissue layers. Scattering of the ultrasonic signal is the deflection of the ultrasonic signal in random directions. Attenuation of the ultrasonic signal is the loss of ultrasonic signal as the signal travels. Reflection of the ultrasonic signal is the bouncing off of the ultrasonic signal from an object and changing its direction of travel. A reflector is an object that reflects ultrasonic signals. Transmission of the ultrasonic signal is the passing of the ultrasonic signal through a medium. As it travels, the ultrasonic energy is scattered, attenuated, reflected, and/or transmitted. The portion of the reflected or scattered signal that returns to the transducers is detected as echoes by detecting transducers. The detecting transducers convert the ultrasound echoes to electronic echo signals and, after amplification and digitization, furnishes these signals to a reconstruction unit. The reconstruction unit in turn calculates locations of echo sources. After reconstructing, the calculated positional information is used to generate two-dimensional data that can be presented as an image.

Oscillations in ultrasonic signal intensity are often called "side lobes." Side lobes occur when the ultrasonic signal's intensity oscillates as a function of position rather than falls off monotonically as a function of distance from the center of the medium under investigation. The term "apodization" refers to the process of affecting the distribution of ultrasonic signal intensity of transducer elements to reduce side lobes.

Ultrasound imaging systems typically use a transducer array having a fixed number of transducer elements. The number of transmit and/or receive channels used by the system may be less than the number of transducer elements to lower costs and increase portability. Multiplexers typically control the size and location of active transmit and receive apertures in hardware by selecting which transducer elements are coupled to the transmit and/or receive channels. For the purposes of this application, the size of an aperture is expressed as a number of active transducer elements.

Lateral resolution is the minimum separation between two point reflectors in a medium under investigation that can produce two separate echoes with an ultrasound system. Lateral resolution may be poor if the image of a point target is too wide, and two or more closely spaced reflectors are detected as a single reflector. Sensitivity is the ability of an ultrasound system to detect weak echoes. Contrast resolution is the ability of an ultrasound system to distinguish differences in strength of adjacent echoes. Improving lateral resolution, sensitivity, and contrast resolution improves the overall performance of an ultrasound system.

There are various known methodologies for improving the lateral resolution, sensitivity, and contrast resolution in an ultrasound imaging system having a limited number of transmit and/or receive channels. For example, a synthetic transmit aperture or receive aperture improves lateral resolution, sensitivity, and contrast resolution, but results in a reduced frame rate. A synthetic receive aperture can be implemented by making two or more transmit firings in the same image area (or line) and using different receive channels for each firing using multiplexer control. The receive aperture is synthesized from all of the firings to form a larger effective receive aperture. A synthetic transmit aperture or receive aperture can also be implemented by utilizing the symmetry of some scan formats, such as linear and curved linear formats. For example, the symmetry of some scan formats results in symmetric element pairs. Shorting symmetric element pairs together in hardware increases the effective aperture during transmission or reception. However, such an implementation in hardware only extracts a single line of information per firing.

Another known methodology for improving lateral resolution, sensitivity, and contrast resolution in an ultrasound imaging system with a limited number of transmit and/or receive channels is using adaptive element pitch control through various multiplexer connections. Adaptive element pitch control is implemented in hardware through multiplexer connections and includes element skipping, element shorting, and a combination of both. Adaptive element pitch selection can be changed for different operating modes, for example B-mode or color flow imaging, or for different operating frequencies. Since adaptive element pitch control is implemented in hardware, the transmit and/or receive aperture cannot be adaptively varied as a function of the depth of the imaging point.

SUMMARY OF THE INVENTION

In accordance with the present invention, a system and method are disclosed to implement an adaptive receive aperture for ultrasound image reconstruction. In one embodiment, the method of the invention includes determining a size of a desired receive aperture at each imaging point, comparing the size of the desired receive aperture with a predetermined number of reconstruction channels, if the size of the desired receive aperture is not greater than the number of reconstruction channels, processing echo signals for the desired receive aperture to produce an ultrasound image, and if the size of the desired receive aperture is greater than the number of reconstruction channels, preprocessing the echo signals for the desired receive aperture to produce reconstruction signals that are equal in number to the number of reconstruction channels, and then processing the reconstruction signals to produce an ultrasound image. The size of the desired receive aperture may be based on the line and the depth of an imaging point in a region of interest in a medium under investigation. Reconstruction channels are the processing channels of the reconstruction processor determined by the processing power and the frame rate requirement of the ultrasound system.

In one embodiment, the system of the invention includes a transducer array having a plurality of transducer elements. Each of the transducer elements is configured to receive ultrasonic signals and convert them into electronic echo signals. The system also includes a multiplexer for selectively coupling transducer elements in the transducer array, and passing the selected echo signals from the selected receive channels. A reconstruction unit is configured to receive the selected echo signals from the multiplexer. The reconstruction unit includes a receive aperture control engine configured to use the selected echo signals to adaptively determine a set of reconstruction signals. The receive aperture control engine compares the size of the receive aperture with a predetermined number of reconstruction channels at each imaging point. If the size of the receive aperture is not greater than the number of reconstruction channels, the receive aperture control engine passes all of the selected echo signals for further processing by a reconstruction processor. If the size of the receive aperture is greater than the number of reconstruction channels, the receive aperture control engine preprocesses the echo signals to produce reconstructions signals that are equal in number to the number of reconstruction channels, and outputs the reconstruction signals for further processing by the reconstruction processor.

In one embodiment, preprocessing the echo signals includes grouping qualified channels in the receive aperture by taking a weighted sum of each group. A group of qualified channels may be a pair of adjacent channels or channels with symmetry with respect to the imaging point. In one embodiment, the receive aperture control engine identifies groups of qualified channels by determining whether the phase difference between echo signals for a group of channels is less than a specified value. Preprocessing may also include skipping (ignoring) echo signals for certain channels in the receive aperture.

DETAILED DESCRIPTION

Figure 1:
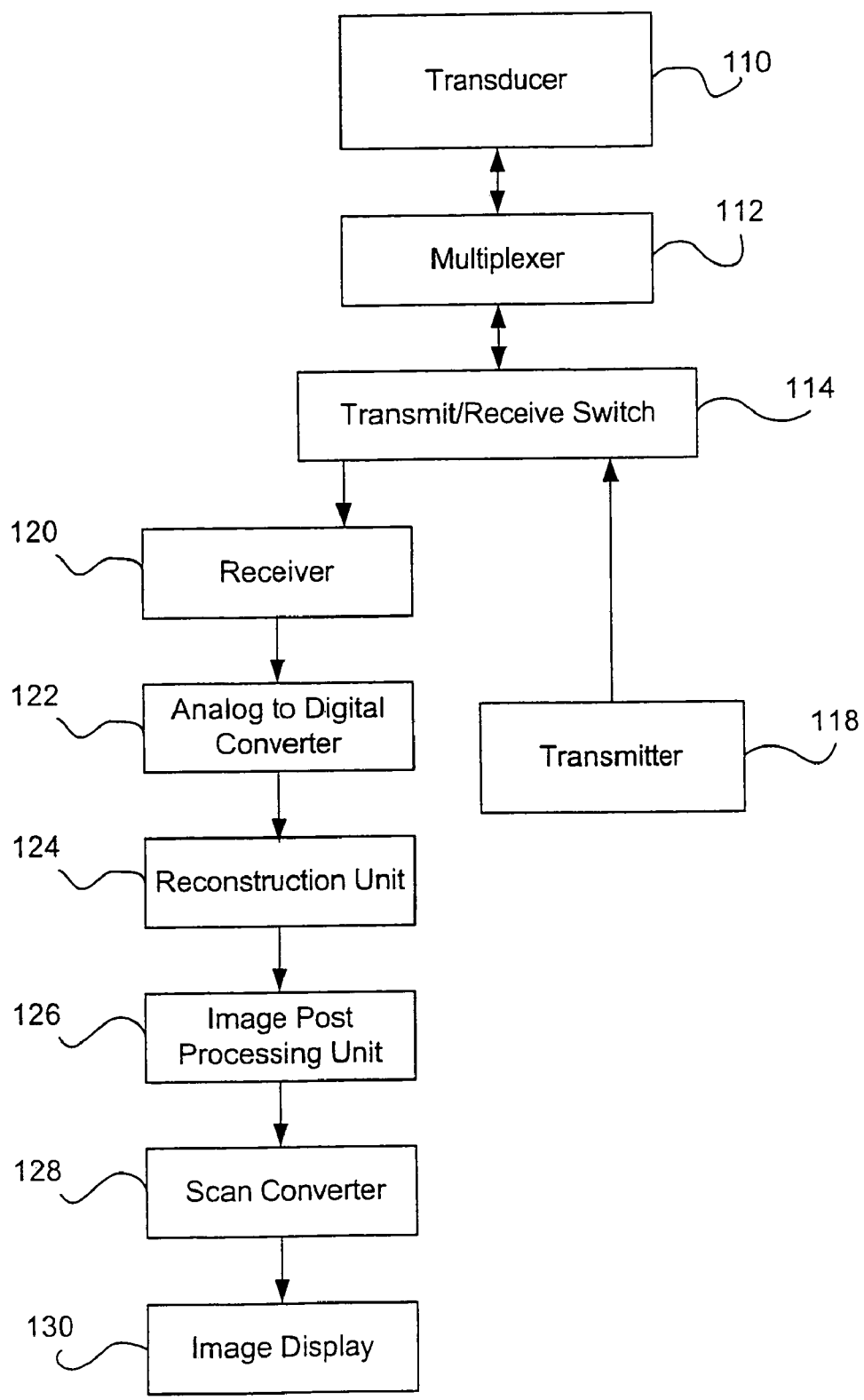
FIG. 1 is a block diagram of one embodiment for an ultrasound imaging system, in accordance with the present invention.

FIG. 1 is a block diagram of one embodiment of an ultrasound imaging system that includes, but is not limited to, a transducer 110, a multiplexer 112, a transmit/receive switch 114, a transmitter 118, a receiver 120, an analog to digital converter 122, a reconstruction unit 124, an image post processing unit 126, a scan converter 128, and an image display 130. Transducer 110 includes an array of transducer elements that may be arranged in various configurations, such as linear, sector, and curved linear. Each of the transducer elements is configured to produce and receive ultrasonic signals. Transducer 110 converts electronic signals into ultrasonic signals while transmitting, and converts received ultrasonic signals into electronic echo signals while receiving. Multiplexer 112 controls which transducer elements in transducer 110 are coupled to transmit and/or receive channels for transmitting and/or receiving ultrasonic signals. Multiplexer 112 controls the size and location of a receive aperture by coupling certain transducer elements to transmit/receive switch 114. Transmitter 118 produces electronic signals for driving transducer 110 to produce, focus or defocus, and steer an ultrasound beam. Transmit/receive switch 114 allows signals from transmitter 118 to pass to multiplexer 112, and allows echo signals from multiplexer 112 to pass to receiver 120.

Receiver 120 receives echo signals via transmit/receive switch 114 and multiplexer 112 from transducer 110, and outputs the echo signals to analog to digital converter 122. Reconstruction unit 124 processes the digital echo signals from analog to digital converter 122 to produce reconstructed in-phase (I) and quadrature (Q) signals for each imaging point that are output to image post processing unit 126. The contents and functionality of reconstruction unit 124 are further discussed below in conjunction with FIG. 2. Image post processing unit 126 processes the I and Q signals, and scan converter 128 processes the output of image post processing unit 126 to produce image data that is output to image display 130. Image post processing unit 126 and scan converter 128 may process the I and Q signals to produce, for example, B-mode (gray-scale) image data, color image data, color Doppler image data, or any other type of image data appropriate for producing an ultrasound image.

Figure 2:
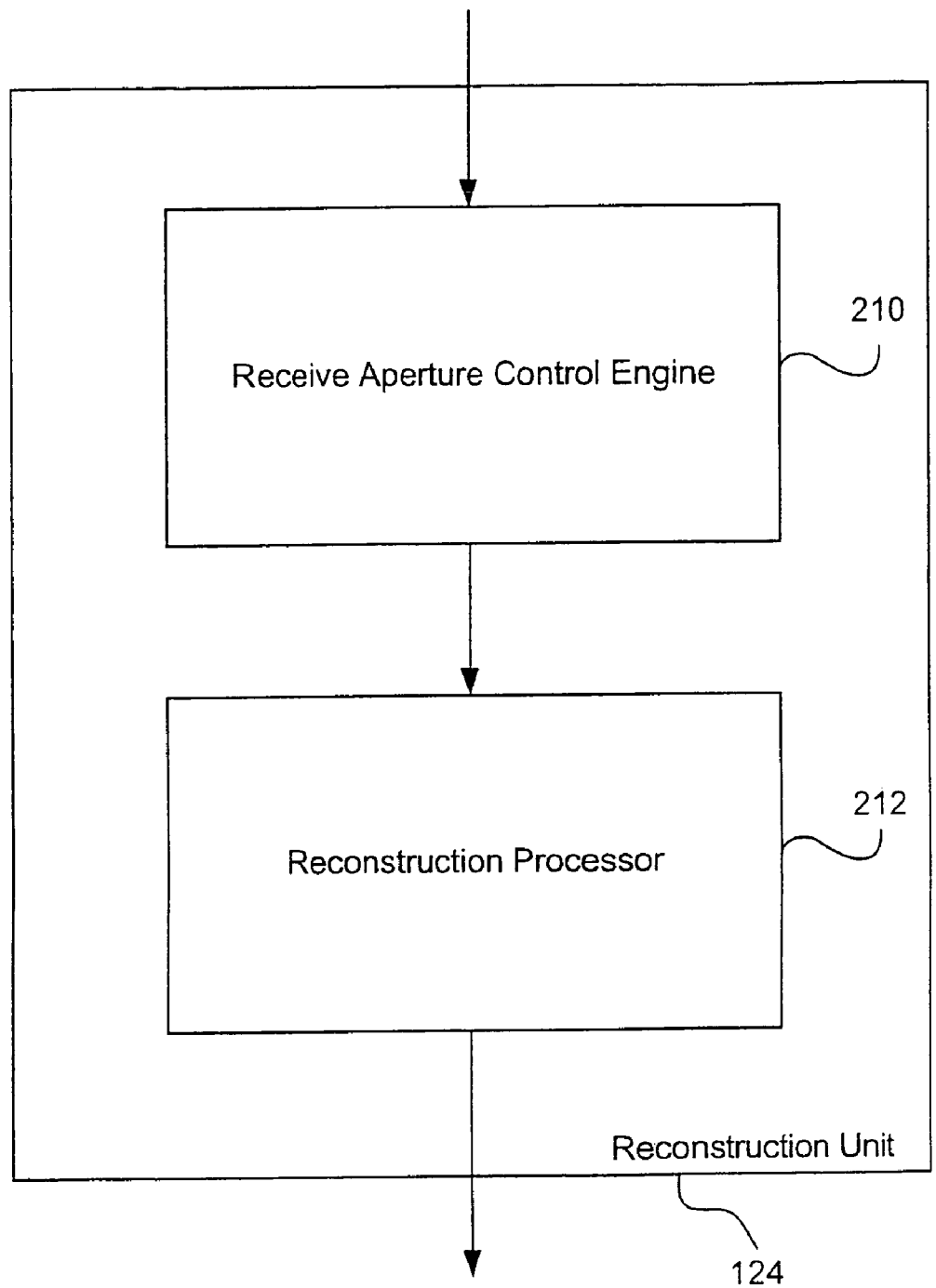
FIG. 2 is a block diagram of one embodiment of the reconstruction unit of FIG. 1, in accordance with the invention.

FIG. 2 is a block diagram of one embodiment of reconstruction unit 124 of FIG. 1, in accordance with the invention. Reconstruction unit 124 includes, but is not limited to, a receive aperture control engine 210 and a reconstruction processor 212. The input to receive aperture control engine 210 is the digitized signals from all receive channels within the receive aperture in the format of I and Q signals. Receive aperture control engine 210 adaptively determines a set of reconstruction signals and sends the reconstruction signals, and their corresponding phase alignment and apodization information, to reconstruction processor 212. The functionality of receive aperture control engine 210 is further discussed below in conjunction with FIG. 3.

Reconstruction processor 212 combines the reconstruction signals and their corresponding phase alignment and apodization information into a single digital signal at every imaging point in the format of I and Q signals. The reconstructed I and Q signals are output to image post processing unit 126 (FIG. 1).

Figure 3:
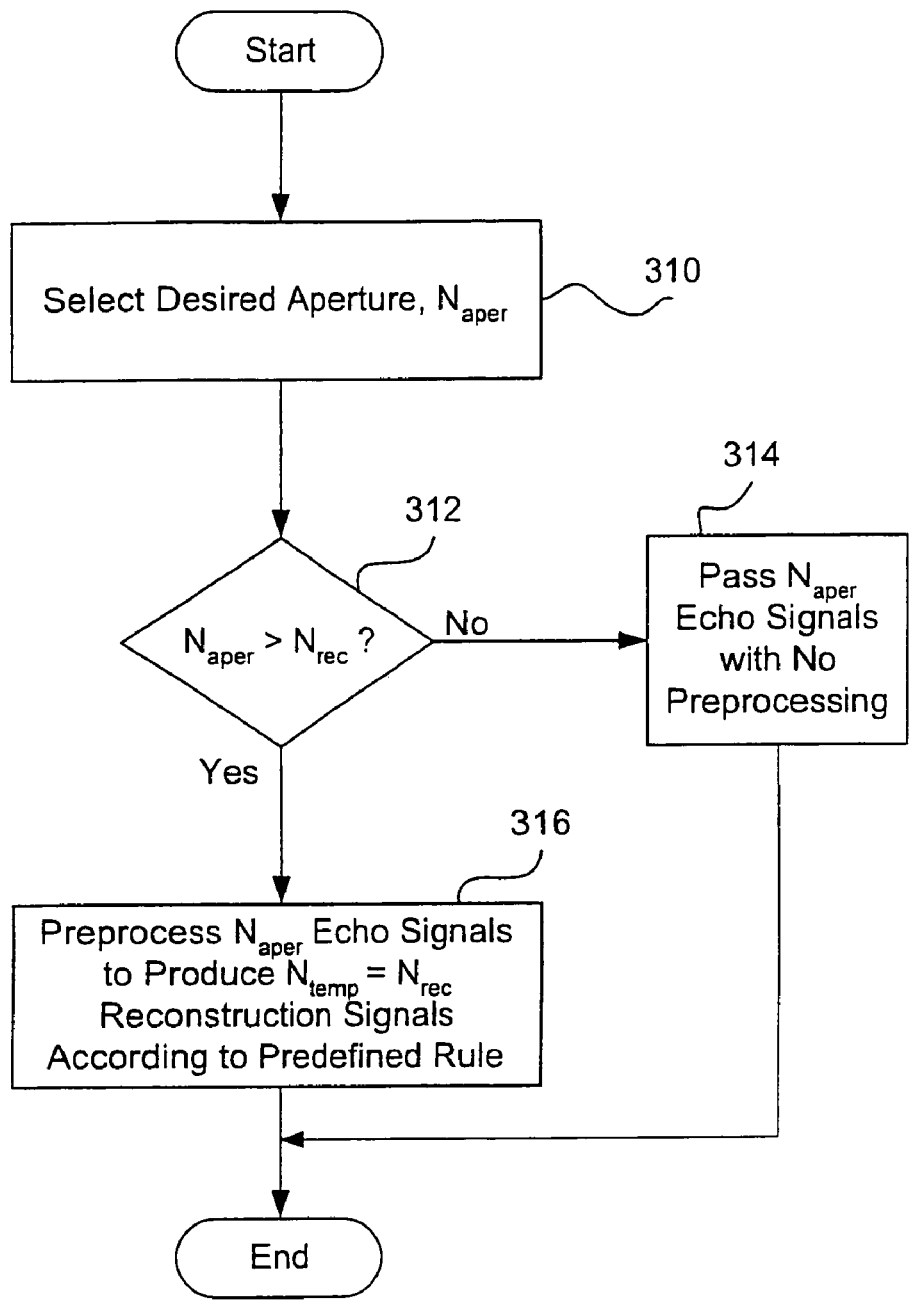
FIG. 3 is a flowchart of method steps for adaptively determining a set of reconstruction signals, in accordance with one embodiment of the invention.

FIG. 3 is a flowchart of method steps for adaptively determining a set of reconstruction signals, according to one embodiment of the invention. An ultrasound system may transmit ultrasonic signals into a medium under investigation, for example a human patient, to produce an image of a region of interest, for example the abdomen. In general, increasing the depth of an imaging point requires increasing the number of reconstruction channels, which corresponds to slower reconstruction or a need for greater computational power, and decreasing the depth of an imaging point requires decreasing the number of reconstruction channels, which corresponds to faster reconstruction or a need for lower computational power. Practically, the ultrasound system may not be able to support the number of reconstruction channels required. A number of reconstruction channels, $N_{rec}$, is set by the ultrasound system for each imaging point at a line m and a depth r. $N_{rec}$ may be set according to various criteria, for example cost and desired frame rate. $N_{rec}$ indicates a number of available reconstruction channels, but does not indicate a particular set of reconstruction channels or receive channels in the system.

In step 310, receive aperture control engine 210 selects a desired receive aperture, $N_{aper}$, which is a function of the imaging point at line m and depth r, and is expressed as a number of channels. Typically, an imaging point at a shallower depth requires a smaller receive aperture and an imaging point at a deeper depth requires a larger receive aperture for a given resolution. Then, in step 312, receive aperture control engine 210 determines whether $N_{aper}$ is greater than $N_{rec}$. If $N_{aper}$ is not greater than $N_{rec}$, then a number of reconstruction signals $N_{temp}$ is set equal to $N_{aper}$, and in step 314 receive aperture control engine 210 passes the received echo signals, and their corresponding phase alignment and apodization information, for the $N_{aper}$ channels to reconstruction processor 212 with no preprocessing. When $N_{aper}$ is not greater than $N_{rec}$, the echo signals are the reconstruction signals used by reconstruction processor 212 to produce the I and Q signals.

If $N_{aper}$ is greater than $N_{rec}$, then the method continues with step 316, where receive aperture control engine 210 preprocesses the received echo signals to produce $N_{temp}$ reconstruction signals according to a predefined rule, where the number of reconstruction signals $N_{temp}$ is set equal to $N_{rec}$. In one embodiment, the predefined rule is to group qualified channels and, if necessary, skip channels in the receive aperture such that the number of reconstruction signals ($N_{temp}$) is equal to $N_{rec}$. In one embodiment, a set of adjacent (two or more) channels is qualified if the phase difference between echo signals corresponding to the adjacent channels is smaller than a specified value (e.g., forty-five degrees). In another embodiment, a set of channels that are symmetric with respect to the imaging point is qualified because the phases of the symmetric channels are equal. In another embodiment, both qualified adjacent channels and qualified symmetric channels are grouped if they are all qualified according to the predefined rule. Receive aperture control engine 210 groups qualified channels by taking a weighted sum of the received echo signals from the channels in each group. The weights for grouped channels may be equal, or may be set based on a receive aperture apodization function. The corresponding phase alignment and apodization information of the reconstruction signal for a channel group represents the phase alignment and apodization information of that group.

If all qualified channels are grouped and the resulting number of reconstruction signals is greater than $N_{rec}$, then receive aperture control engine 210 skips selected channels in the receive aperture (i.e., ignores the echo signals on selected channels) to reduce the number of reconstruction signals to be equal to $N_{rec}$.

Figure 4A:
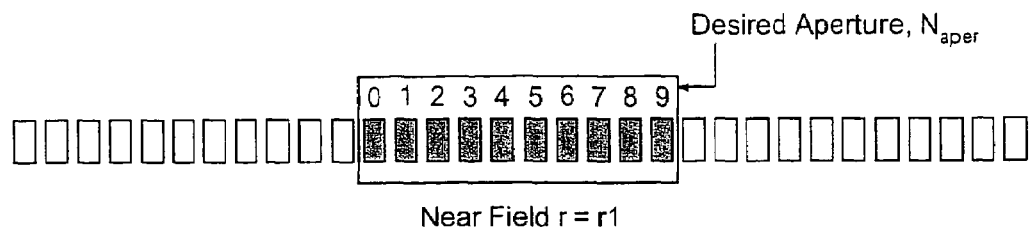
FIGS. 4A-4E illustrate determining reconstruction signals in accordance with one embodiment of the invention.
Figure 4B:
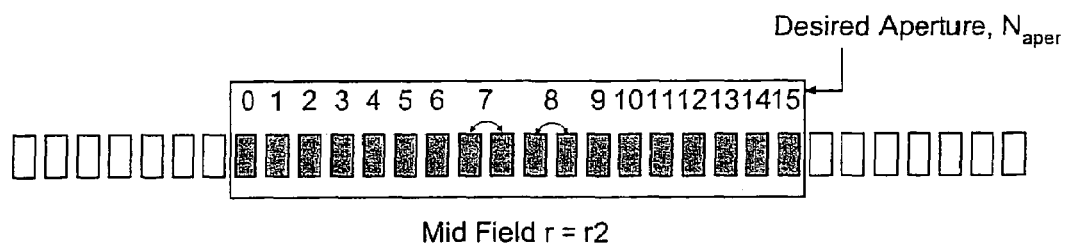
Figure 4C:
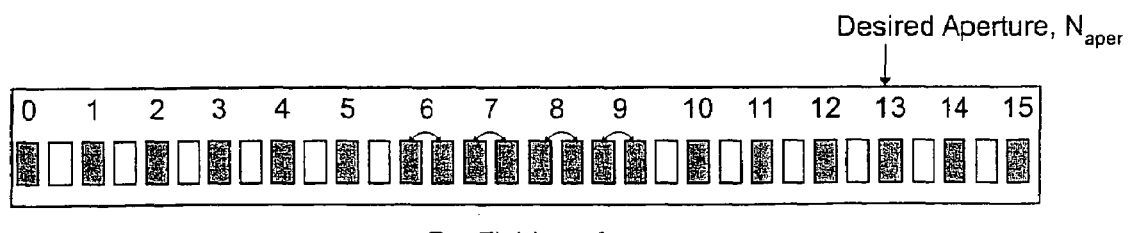
Figure 4D:
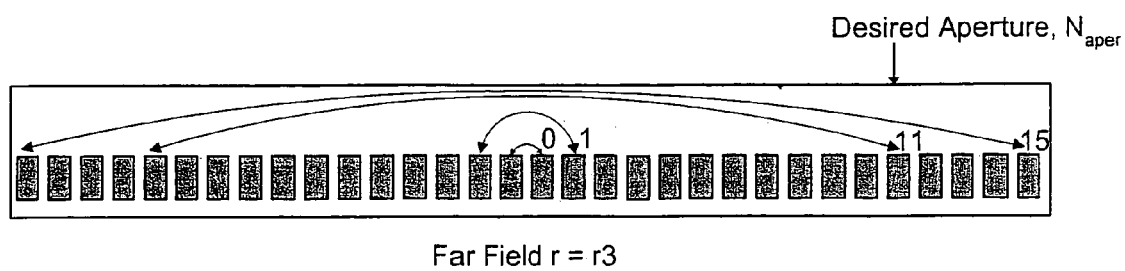
Figure 4E:
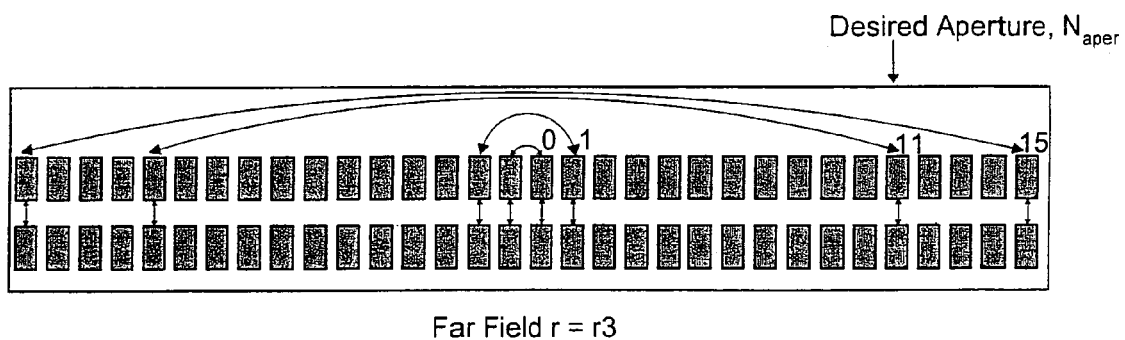

FIGS. 4A-4E illustrate selection of reconstruction signals in accordance with one embodiment of the invention. For the purpose of illustration, the maximum number of receive channels shown in FIGS. 4A-4D is thirty-two and in FIG. 4E is sixty-four, and the number of available reconstruction channels $N_{rec}$ is sixteen; however, any maximum number of receive channels and any value of $N_{rec}$ are within the scope of the invention. In FIG. 4A, the imaging point to be reconstructed is in a near field at depth r1, and the size of the desired aperture, $N_{aper}$, is ten channels. Since $N_{aper}$ is not greater than $N_{rec}$ (i.e., 10<16), the number of reconstruction signals $N_{temp}$ is set equal to $N_{aper}$, and receive aperture control engine 210 passes the received echo signals as the reconstruction signals, and their phase alignment and apodization information, for all $N_{aper}$ channels to reconstruction processor 212. The reconstruction signals and their phase alignment and apodization information are further processed by reconstruction processor 212 to produce I and Q signals of the imaging point.

In FIG. 4B, the imaging point is in a mid field at depth r2, and the desired aperture, $N_{aper}$, is eighteen channels. The imaging point is at a greater depth than that of FIG. 4A, and thus the desired aperture is larger. Since $N_{aper}$ is greater than $N_{rec}$ (i.e., 18 >16), receive aperture control engine 210 sets $N_{temp}$ equal to $N_{rec}$ and preprocesses the received echo signals to produce $N_{temp}$ reconstruction signals according to the predefined rule described above in conjunction with FIG. 3. In FIG. 4B, receive aperture control engine 210 determines that there are four qualified pairs of adjacent channels, but since there are only two extra data points ($N_{aper}-N_{rec}=18-16=2$), receive aperture control engine 210 groups two pairs of channels (indicated by arrow connectors in FIG. 4B) by taking a weighted sum of the echo signals of the adjacent channels, resulting in reconstruction signals for the reconstruction channels labeled seven and eight in FIG. 4B. The corresponding phase alignment and apodization information of the reconstruction signal for a grouped pair of channels represents the phase alignment and apodization information of that pair.

In FIG. 4C, the imaging point is in a far field at depth r3, and the desired aperture, $N_{aper}$, is thirty-two channels. The imaging point is at a deeper depth than those of FIGS. 4A and 4B, and thus the desired aperture is larger. Since $N_{aper}$ is greater than $N_{rec}$ (i.e., 32>16), receive aperture control engine 210 sets $N_{temp}$ equal to $N_{rec}$ and preprocesses the received echo signals to produce $N_{temp}$ reconstruction signals according to the predefined rule described above in conjunction with FIG. 3. In the FIG. 4C embodiment, receive aperture control engine 210 determines that there are four qualified pairs of adjacent channels, and groups the four pairs of channels (indicated by arrow connectors in FIG. 4C) by taking a weighted sum of each pair of adjacent channels, resulting in reconstruction signals for the reconstruction channels labeled six through nine in FIG. 4C. The corresponding phase alignment and apodization information of the reconstruction signal for a grouped pair of channels represents the phase alignment and apodization information of that pair.

After grouping all of the available qualified pairs of adjacent channels, receive aperture control engine 210 still needs to reduce the number of channels by twelve. Since there are no remaining qualified pairs of adjacent channels, receive aperture control engine 210 discards twelve channels by skipping alternate channels from each side of the grouped channels. Receive aperture control engine 210 ignores the echo signals that correspond to the skipped channels by not passing them to reconstruction processor 212. Receive aperture control engine 210 then outputs the $N_{temp}$ reconstruction signals and their corresponding phase alignment and apodization information to reconstruction processor 212.

In FIG. 4D, the imaging point is in a far field at depth r3 as in FIG. 4C, and the desired aperture, $N_{aper}$, is thirty-two channels. In the FIG. 4D embodiment, the scan format of the ultrasound system is linear, curved linear, or any other scan format that applies symmetric delay profiles with respect to reconstruction line origin. Receive aperture control engine 210 determines that there are sixteen pairs of channels that are symmetric about the imaging point, and qualify for grouping. Receive aperture control engine 210 groups all sixteen pairs of symmetric channels (indicated by arrow connectors in FIG. 4D) by taking a weighted sum of each pair of symmetric channels, resulting in reconstruction signals for the reconstruction channels labeled zero through fifteen in FIG. 4D. After grouping, the number of reconstruction signals is equal to $N_{rec}$, so no channels need to be skipped.

In FIG. 4E, the maximum number of receive channels is sixty-four, and the receive channels are arranged as a two-dimensional array. Only two channels in the elevation direction are shown for ease of illustration; however, any number of receive channels in the elevation and any type of symmetry of transducer 110 is within the scope of the invention. The imaging point is in a far field at depth r3 and the desired aperture, $N_{aper}$, is sixty-four channels. In the FIG. 4E embodiment, the scan format of the ultrasound system is linear, curved linear, or any other scan format that applies symmetric delay profiles with respect to reconstruction line origin. Receive aperture control engine 210 determines that there are sixteen sets of four channels that are symmetric about the imaging point and qualify for grouping. Receive aperture control engine 210 groups all sixteen sets of four qualified channels (indicated by arrow connectors in FIG. 4E) by taking a weighted sum of each set of four channels, resulting in reconstruction signals for the reconstruction channels labeled zero through fifteen in FIG. 4E. After grouping, the number of reconstruction signals is equal to $N_{rec}$, so no channels need to be skipped.

Receive aperture control engine 210 determines whether to preprocess the received echo signals at each imaging point and determines how to preprocess the received echo signals at each imaging point. Channels are discarded or grouped within the desired receive aperture only when necessary. Preprocessing the received echo signals according to the invention optimizes the use of the reconstruction processing power of the ultrasonic imaging system of FIG. 1. According to the invention, the effective receive aperture can be adaptively varied as a function of the location of the imaging point. The ultrasonic imaging system is able to optimally use the limited number of reconstruction channels to provide improved lateral resolution, sensitivity, and contrast resolution at each imaging point in a region of interest in a medium under investigation.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An ultrasound reconstruction unit having a receive aperture, comprising:
a transducer array comprising one or more transducer elements, the one or more transducer elements configured to receive ultrasound signals from a medium of interest and convert the received ultrasound signals into echo signals;
a multiplexer configured to selectively couple the one or more transducer elements in the transducer array and pass selected echo signals; and
a receive aperture control engine configured to:
adaptively determine a set of reconstruction signals based on at least a series of selected echo signals;
compare the size of the receive aperture with a predetermined number of reconstruction channels at each imaging point, wherein the size of the receive aperture is expressed as a number or active transducer elements; and
pass the selected echo signals from selected receive channels of the one or more transducer elements to a reconstruction processor if the size of the receive aperture is not greater than the number of reconstruction channels.

2. The ultrasound reconstruction unit of claim 1, wherein the size of the receive aperture is based on the line and the depth of an imaging point in a region of interest in the medium of interest.

3. The ultrasound reconstruction unit of claim 1, wherein the reconstruction processor further produces an ultrasound image.

4. An ultrasound reconstruction unit having a receive aperture, comprising:
a transducer array comprising one or more transducer elements, the one or more transducer elements configured to receive ultrasound signals from a medium of interest and convert the received ultrasound signals into echo signals;
a multiplexer configured to selectively couple the one or more transducer elements in the transducer array and pass selected echo signals; and
a receive aperture control engine configured to:
adaptively determine a set of reconstruction signals based on at least a series of selected echo signals;
compare the size of the receive aperture with a predetermined number of reconstruction channels at each imaging point, wherein the reconstruction channels are determined in part by a processing power of the ultrasound reconstruction unit; and
pass the selected echo signals from selected receive channels of the one or more transducer elements to a reconstruction processor if the size of the receive aperture is not greater than the number of reconstruction channels.

5. An ultrasound reconstruction unit having a receive aperture, comprising:
a transducer array comprising one or more transducer elements, the one or more transducer elements configured to receive ultrasound signals from a medium of interest and convert the received ultrasound signals into echo signals;
a multiplexer configured to selectively couple the one or more transducer elements in the transducer array and pass selected echo signals; and
a receive aperture control engine configured to:
adaptively determine a set of reconstruction signals based on at least a series of selected echo signals;
compare the size of the receive aperture with a predetermined number of reconstruction channels at each imaging point, wherein the reconstruction channels are determined in part by a frame rate requirement of the ultrasound reconstruction unit; and pass the selected echo signals from selected receive channels of the one or more transducer elements to a reconstruction processor if the size of the receive aperture is not greater than the number of reconstruction channels.

6. The ultrasound reconstruction unit of claim 1, wherein the reconstruction processor is further configured to product in-phase and quadrature signals.

7. An ultrasound reconstruction unit having a receive aperture, comprising:
   a transducer array comprising one or more transducer elements, wherein the size of the receive aperture is expressed as a number or active transducer elements, the one or more transducer elements configured to receive ultrasound signals from a medium of interest and convert the received ultrasound signals into echo signals;
   a multiplexer configured to selectively couple the one or more transducer elements in the transducer array and pass selected echo signals; and
   a receive aperture control engine configured to:
      adaptively determine a set of reconstruction signals based on at least the selected echo signals;
      compare the size of the receive aperture with a predetermined number of reconstruction channels at each imaging point and preprocess the selected echo signals to produce reconstructions signals that are equal in number to the number of reconstruction channels if the size of the receive aperture is greater than the number of reconstruction channels; and
      output the reconstruction signals for further processing by the reconstruction processor.

8. The ultrasound reconstruction unit of claim 7, wherein the size of the receive aperture is based on the line and the depth of an imaging point in a region of interest in the medium of interest.

9. The ultrasound reconstruction unit of claim 7, wherein the reconstruction processor further produces an ultrasound image.

10. An ultrasound reconstruction unit having a receive aperture, comprising:
   a transducer array comprising one or more transducer elements, the one or more transducer elements configured to receive ultrasound signals from a medium of interest and convert the received ultrasound signals into echo signals;
   a multiplexer configured to selectively couple the one or more transducer elements in the transducer array and pass selected echo signals; and
   a receive aperture control engine configured to:
      adaptively determine a set of reconstruction signals based on at least the selected echo signals;
      compare the size of the receive aperture with a predetermined number of reconstruction channels at each imaging point, wherein the reconstruction channels are determined in part by a processing power of the ultrasound reconstruction unit;
      preprocess the selected echo signals to produce reconstructions signals that are equal in number to the number of reconstruction channels if the size of the receive aperture is greater than the number of reconstruction channels; and
      output the reconstruction signals for further processing by the reconstruction processor.

11. An ultrasound reconstruction unit having a receive aperture, comprising:
   a transducer array comprising one or more transducer elements, the one or more transducer elements configured to receive ultrasound signals from a medium of interest and convert the received ultrasound signals into echo signals;
   a multiplexer configured to selectively couple the one or more transducer elements in the transducer array and pass selected echo signals; and
   a receive aperture control engine configured to:
      adaptively determine a set of reconstruction signals based on at least the selected echo signals;
      compare the size of the receive aperture with a predetermined number of reconstruction channels at each imaging point, wherein the reconstruction channels are determined in part by a frame rate requirement of the ultrasound reconstruction unit, and preprocess the selected echo signals to produce reconstructions signals that are equal in number to the number of reconstruction channels if the size of the receive aperture is greater than the number of reconstruction channels; and
      output the reconstruction signals for further processing by the reconstruction processor.

12. The ultrasound reconstruction unit of claim 7, wherein the reconstruction processor is further configured to product in-phase and quadrature signals.

13. The ultrasound reconstruction unit of claim 7, wherein preprocessing the selected echo signals comprises grouping qualified channels in the receive aperture by taking a weighted sum of each group.

14. The ultrasound reconstruction unit of claim 13, wherein a group of qualified channels comprises a pair of adjacent channels.

15. An ultrasound reconstruction unit having a receive aperture, comprising:
   a transducer array comprising one or more transducer elements, the one or more transducer elements configured to receive ultrasound signals from a medium of interest and convert the received ultrasound signals into echo signals;
   a multiplexer configured to selectively couple the one or more transducer elements in the transducer array and pass selected echo signals; and
   a receive aperture control engine configured to:
      adaptively determine a set of reconstruction signals based on at least the selected echo signals;
      compare the size of the receive aperture with a predetermined number of reconstruction channels at each imaging point, wherein a group of qualified channels comprises channels with symmetry with respect to an imaging point;
      preprocess the selected echo signals to produce reconstructions signals that are equal in number to the number of reconstruction channels if the size of the receive aperture is greater than the number of reconstruction channels, wherein preprocessing the selected echo signals comprises grouping qualified channels in the receive aperture by taking a weighted sum of each group; and
      output the reconstruction signals for further processing by the reconstruction processor.

16. The ultrasound reconstruction unit of claim 7, wherein preprocessing the selected echo signals comprises skipping echo signals for certain channels in the receive aperture.

17. The ultrasound reconstruction unit of claim 7, wherein the receive aperture control engine is further configured to identify groups of qualified channels by determining whether a phase difference between echo signals for a group of channels is less than a specified value.

18. An ultrasound reconstruction unit configured to:
receive selected echo signals from a plurality of transducer elements, the ultrasound reconstruction unit comprising a receive aperture control engine configured to use selected echo signals to adaptively determine a set of reconstruction signals and process the set of reconstruction signals to produce in-phase and quadrature signals.

19. The ultrasound reconstruction unit of claim 18, wherein the receive aperture control engine is further configured to adaptively determine a number of reconstruction signals by comparing a number of channels of a receive aperture with a number of reconstruction channels.

* * * * *